United States Patent [19]

Dowling et al.

[11] 3,900,826

[45] Aug. 19, 1975

[54] ACOUSTIC PERMEABILITY LOG UTILIZING DIFFERENTIAL TRAVEL TIME MEASUREMENTS

[75] Inventors: Donald J. Dowling; John F. Boyd, both of Houston, Tex.

[73] Assignee: Texaco Inc., New York, N.Y.

[22] Filed: Oct. 31, 1973

[21] Appl. No.: 411,561

[52] U.S. Cl... 340/15.5 TN; 310/15.5 AC; 181/106; 181/119; 175/50
[51] Int. Cl............................................... G01v 1/40
[58] Field of Search........... 181/.5 LD, .5 FS, .5 NP; 340/15.5 TN, 15.5 AC; 175/48, 50

[56] References Cited
UNITED STATES PATENTS

| | | | |
|---|---|---|---|
| 3,363,719 | 1/1968 | Venghiattis.................. | 340/15.5 TN |
| 3,622,969 | 11/1971 | Lebreton..................... | 340/15.5 AC |

OTHER PUBLICATIONS

Swergel et al., "Principles and Applications of the Ultrasonic Flow Meter," 4/55, pp. 112–118, Transactions of AIEE, Vol. 74, Part III, TK1A6.

Primary Examiner—Maynard R. Wilbur
Assistant Examiner—N. Moskowitz
Attorney, Agent, or Firm—T. H. Whaley; C. G. Ries; William J. Beard

[57] ABSTRACT

A permeability logging tool adapted to be lowered to selected elevations in a well bore wherein fluids in any pore spaces in the formation adjacent to the well bore are excited by means of high peak amplitude acoustic pulses of short duration which form compressive and rarefaction wave fronts in the formation, thereby altering localized formation fluid pressure and creating a flow path from a point of high pressure to a point of relatively low pressure. A pair of sonic transceivers used as measuring transducers are also included on the tool. Acoustic signals are transmitted to and fro between these transducers. The change in signal transmission time between the transceivers due to fluid flow rate established by the electrical excitation is measured. The shift in transmission time between the measuring transducers is thus proportionate to the rate of fluid flow in the formation. This shift in time is thus fuctionally related to the permeability of the formation matrix material.

11 Claims, 3 Drawing Figures

ACOUSTIC PERMEABILITY LOG UTILIZING DIFFERENTIAL TRAVEL TIME MEASUREMENTS

BACKGROUND OF THE INVENTION

In the drilling of an oil well, it is very desirable to measure the fluid permeability of the formations adjacent to the bore hole. Such measurements are extremely valuable in evaluating the potential production characteristics of a well. Many methods and techniques for measurement of permeability have been attempted heretofore. In the main, such methods have been inferential as opposed to direct. Permeability describes the ability of fluids to move or flow through the interstices or connected pore spaced of a subterranean formation. When the fluid is able to flow, production of hydrocarbons from a given formation is possible. When the formation has poor permeability, the hydrocarbons are not able to flow and commercially useable recovery from the well is rendered more unlikely.

The methods and apparatus for measuring permeability introduced in the prior art do not measure the permeability in the manner of the present invention. The apparatus of the present invention is particularly useful in obtaining a measure of the permeability of a selected formation penetrated by the well bore.

PRIOR ART

"Principles and Applications of the Ultrasonic Flow Meter" by R. C. Swengel, et al, Transactions AIEE, III, 74, p. 112–118 (1955).

"An Electronic Flow Meter," by Henry P. Kalmus, NBS at the 46th meeting of the Acoustical Society of America, Oct. 15–17, 1953.

DESCRIPTION OF THE INVENTION

The apparatus of the present invention is thus a permeability well logging device which is adapted to be lowered into a well bore to a specified depth and held momentarily stationary. Activation of the logging tool acts to impart short duration pulses of acoustic energy which interact with the formation fluid and provide compression and rarefaction thereof. This creates localized points of increased and decreased fluid pressure in the formation. Flow of the fluid in the formation between the high pressure and low pressure points tends to equalize the fluid pressure in the formation. The excitation transducer field is arranged such that the direction of the induced fluid flow is essentially parallel to the path of an ultrasonic measuring signal travelling between a pair of measuring transducers. Sonic or ultrasonic energy is transferred between the measuring transducers, first in the direction of the fluid flow and, subsequently in the opposite direction. The fluid flow varies the travel time of the acoustic energy between the measuring transducers. The incremental change in transmission time along the path in opposite directions thus provides a measure of formation permeability.

DESCRIPTION OF THE PREFERRED EMBODIMENT

Figure 1:
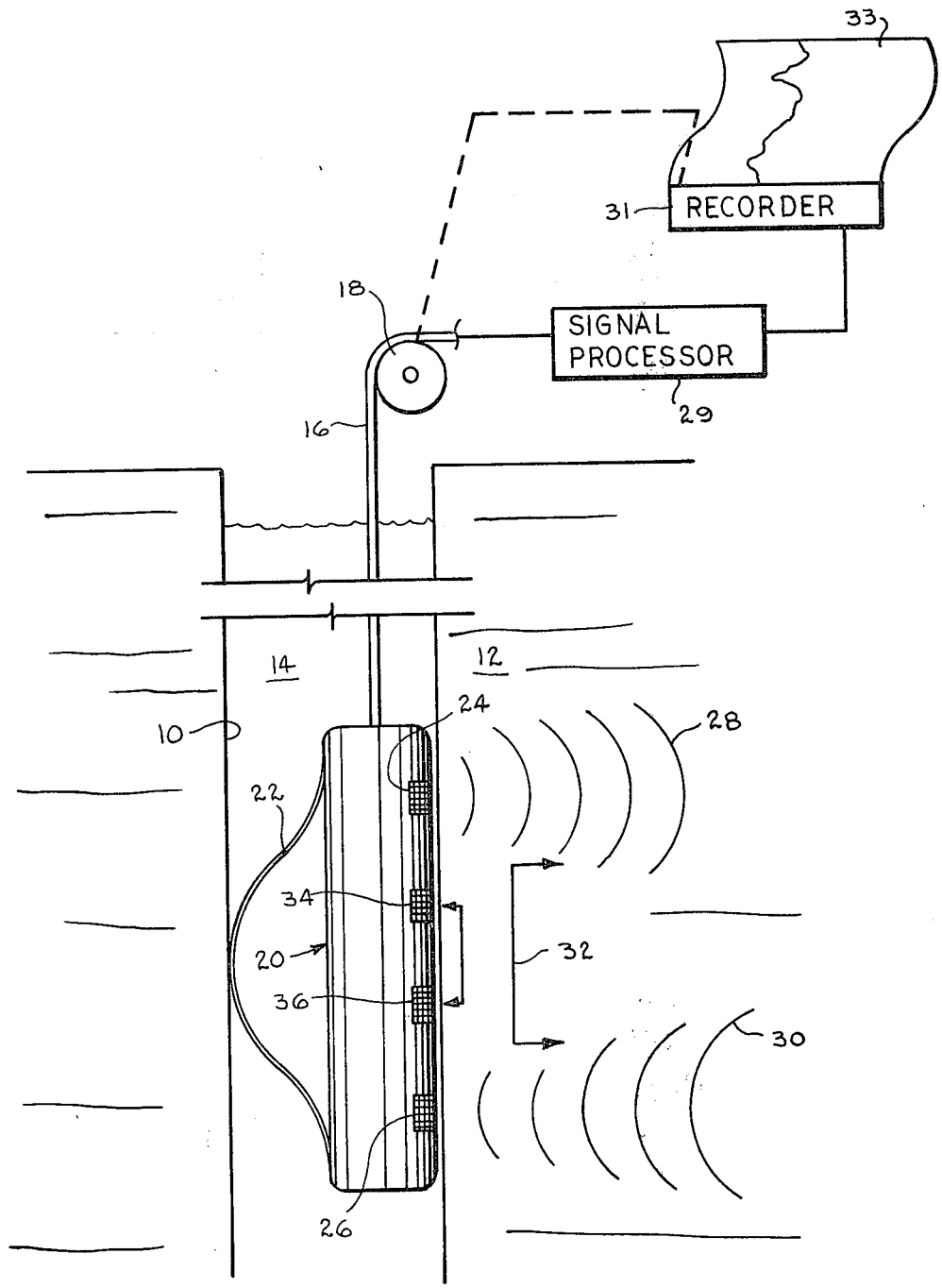
FIG. 1 is a sectional view of a bore hold illustrating schematically a tool in accordance with the teachings of the present invention suspended in the bore hole for making permeability measurements at a specified depth.

Attention is first directed to FIG. 1 of the drawings where a first embodiment of the present invention is illustrated schematically. The numeral 10 identifies a well bore of substantial depth passing through earth formations 12 which are of interest insofar as measurement of the permeability is concerned. The well bore 10 is filled with drilling fluid, commonly known as drilling mud, as indicated at the numeral 14. At the well head, a well logging cable 16 of conventional design passes over a sheave wheel 18 suspending sonde 20 in the well bore. A conventional winch arrangement (not shown) is used to raise and lower the tool. The well logging tool 20 incorporates the formation permeability measuring apparatus of the present invention. The sheave wheel 18 may be electrically or mechanically linked to a recorder 31 having output record medium 33 so that tool measurements may be recorded as a function of depth.

The tool 20 is thus adapted to be lowered to specified depths in the well bore 10 or moved continuously in the borehole. The cable 16, as known in the art, further incorporates electrical conductors as appropriate for transfer of power from the surface to the sonde and transfer of measurements back to the surface. The cable 16 is of substantial length, typically 20,000 feet or longer, and can readily position the sonde in wells of great depth.

The sonde 20 has a decentralizing spring or bow spring 22 which pushes against the wall of the borehole 10. The spring 22 may be opened or closed as desired by surface controls (not shown) of conventional design. The sonde 20 may thus be moved about or temporarily positioned as desired at a selected depth. Located opposite the decentralizer spring 22 and coupled to the exterior of the sonde 20 are a plurality of transducers 24, 26, 34 and 36 used in making the permeability measurement of the invention. These transducers include a pair of excitation transducers indicated generally by the numerals 24 and 26. In this embodiment the excitation transducers are preferably low frequency, acoustic wave generators. By way of example, these transducers comprise piezoelectric crystals or magnetostrictive low frequency acoustic sources. The transducers 24 and 26 apply acoustic energy to the formation 12 as will be described. The transducers 24 and 26 are driven by 180° out of phase electrical pulse signals which generally have about the same amplitude but opposite polarity. Thus, the numeral 28 identifies a low frequency acoustic wave front radiating from the excitation transducer 24 which may be thought of as a compression wave front. The numeral 30 identifies a second acoustic wave front which may be thought of as a rarefaction wave front (since it is 180° phase shifted with respect to wave front 28) radiated from the transducer 26. The compression wave front tends to form a small locale of incrementally increased pressure in the vicinity of transducer 24. By way of contrast, the rarefraction wave front 30 reduces formation fluid pressure in the vicinity of transducer 26.

The numeral 32 identifies a flow path from the regions of higher formation fluid pressure to lower formation fluid pressure. As the polarity of the voltage signals the excitation transducers 24 and 26 are reversed, the direction of fluid flow along the path 32 will be reversed. It is sufficient to note that the wave fronts 28 and 30 cause fluid flow which is generally along the approximate path indicated at 32 in FIG. 1. The precise flow path is not generally known and can vary in different formations.

The acoustic energy coupled to the earth formation 12 from the excitation transducers 24 and 26 is preferably in the lower frequency range, typically for mid to high seismic frequencies, or about 50 to 500 hertz. The transducers 24 and 26 are repetitively pulsed by voltage signals of equal amplitude and opposite polarity as described. Apparatus is known in the art for pulsing such transducers to provide pulses of about 100 kilowatts of short duration. More detail of such arrangements may be seen by reference to U.S. Pat. No. 3,304,537, for example. Pulses of this amplitude are merely representative and do not constitute a limitation on the apparatus of the present invention. Other power levels can be utilized.

The excitation transducers 24 and 26 are located on the same side of the sonde 20 and are spaced relatively apart. Two measuring transducers 34 and 36 are positioned between the excitation transducers 24 and 26. The measuring transducers 34 and 36 are used to obtain measurements of the rate of fluid flow in the formation. These transducers operate preferably at a frequency of at least about ten times greater than the frequency of the acoustic energy radiating from the excitation transducers 24 and 26. The frequency of the transducers 34 and 36 is subject to variation over a wide range but it is preferably a higher frequency to enable relatively easy filtering of any low frequency content from the received signal. The measuring transducers 34 and 36 are alternately used as transmitting and receiving transducers. Hence both transducers 34 and 36 may be referred to as transceiving transducers.

An ultrasonic signal of a specified frequency is transmitted alternately from transducers 34 to 36 and vice versa. In the absence of fluid flow in the formation 12 along the direction of path 32, the travel time will be independent of the path 32 and will be equal for both directions. However, if fluid is flowing in the formation 12 generally along the directions of the path 32, the fluid flow creates a time differential in the travel time of acoustic signals in opposite directions along the flow path 32 which is independent of velocity of the ultrasonic wave front and which is functionally related to the permeability of formation 12.

The apparatus of FIG. 1 is thus used in the following sequence. The transducers 24 and 26 are excited as previously described with one creating (for example) a localized compressional wave and the other creating a localized rarefaction wave. The transducers 24 and 26 are located so that a fluid flow path in the formation approximately parallel to the bore hole is temporarily created. The fluid flow path 32 lasts only so long as the compression and rarefraction impinge on the adjacent formation. While the flow path 32 exists, the ultrasonic burst transmitted between the transducers 34 and 36 moves along the path affected by the fluid flow in the formation 12 and the time of transmission between the transducers 34 and 36 is measured with the signal travelling with the fluid flow and in the opposite direction.

The apparatus shown in FIG. 1 thus measures permeability by obtaining the differential in time required for the high frequency sonic signal to travel between the transducers 34 and 36. This differential results from fluid flow induced in the formation by the excitation transducers 34 and 36. This measurement is independent of the velocity of the ultrasonic energy in the formation. Signals representative thereof are than transmitted to the surface via cable 16, decoded by signal processor 29 and recorded by recorder 31. Preferably, the acoustic frequency transmitted from the measuring transducers 34 and 36 is substantially greater than the frequency from the excitation transducers 24 and 26. By way of example, it is preferably ten times or greater.

Figure 2:
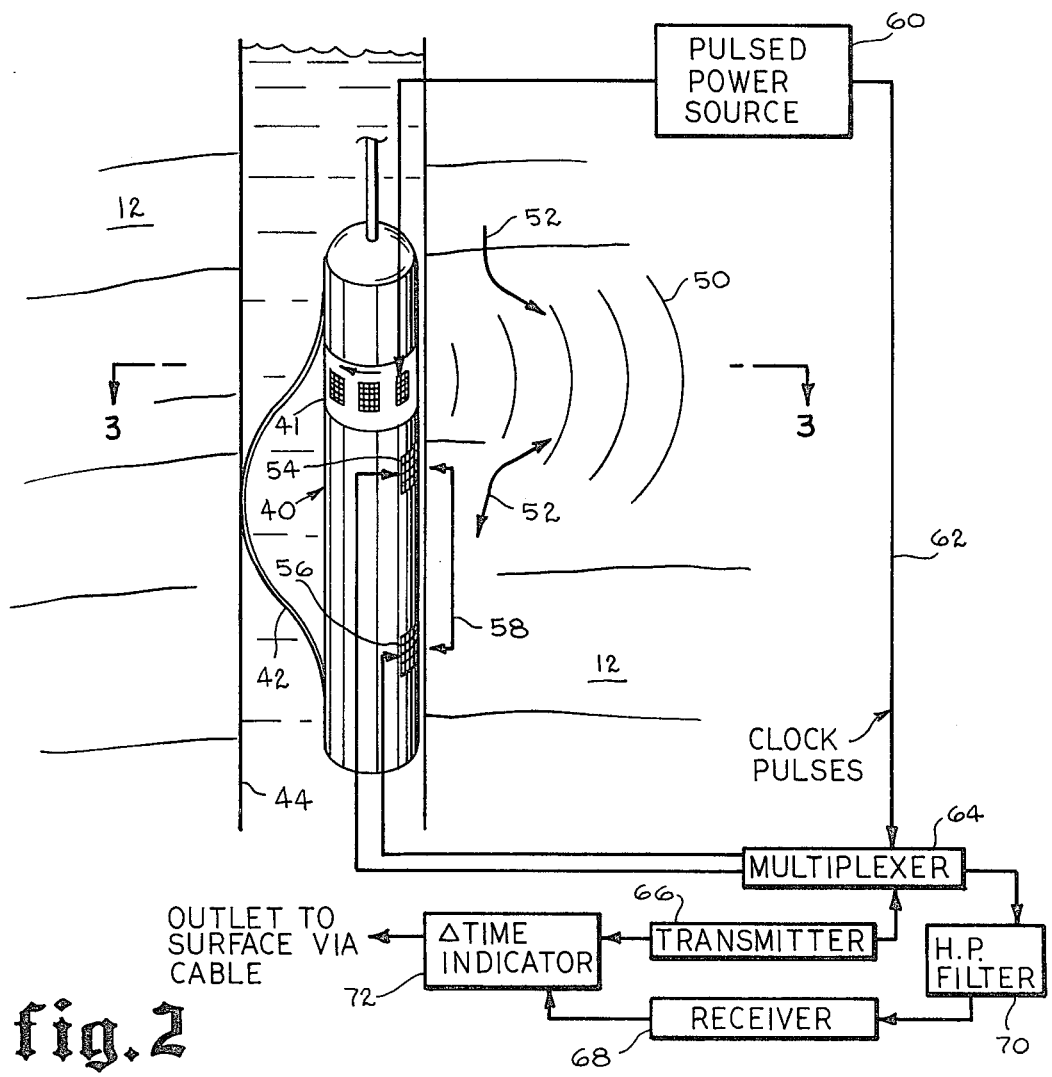
FIG. 2 shows an alternative embodiment of a permeability logging tool in accordance with concepts of the present invention and further incorporates a schematic block diagram of the measuring circuitry incorporated therewith; and, FIG. 3 is a sectional view along the line 3 — 3 of FIG. 2 showing a radiation pattern in the formation for the embodiment of FIG. 2.
Figure 3:
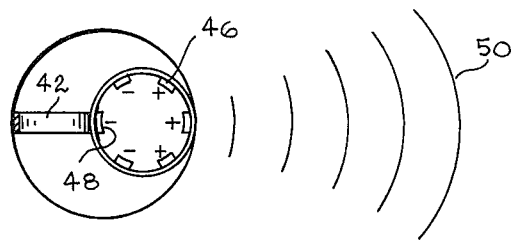

Referring now to FIG. 2 of the drawings, an alternative embodiment of the downhole portion of the present invention is indicated by 40. The sonde 40 again includes a decentralizing spring 42 which forces the sonde to the side of the borehole 44. The sonde 40 includes excitation transducers which are arranged at the same elevation 41 on the sonde. Several such excitation transducers are incorporated as shown in FIG. 3. One group of transducers shown at 46 is positively excited while the remaining transducers 48 are negatively excited by voltage pulses in the same manner shown with respect to the embodiment of FIG. 1. Again, relatively low frequency acoustic transducers are used for this excitation. The tool is normally fully submerged in the drilling fluid filling the borehole 44. The sonic excitation energy from the transducers 46 and 48 is radiated through the adjoining materials including the formation 12 adjacent to the sonde 40. A set of radiated acoustic energy waves are indicated at 50 and are illustrated again in FIG. 3.

The transducers 46 and 48 are selectively rotated to reposition the compression and rarefaction wave fronts. This may be accomplished, for example, by apparatus similar to that shown in U.S. Pat. No. 3,724,589, which incorporates a rotating sonic transducer. This changes the flow patterns in the formation. The transducers 46 and 48 are pulsed with electrical energy at a first position, for example in FIG. 3. The transducers are rotated through a pre-selected angle and thereafter pulsed again. This repositions the zones of localized pressure increase and decrease in the formation 12. The result of this changing mode of propagation of the excitation wave fronts is to create fluid flow along paths generally parallel to the borehole axis as indicated by the arrow 52 with the fluid flow again relieving the localized higher pressure zone.

Measurement transducers 54 and 56 are incorporated in the sonde 40 and acoustically coupled to the exterior thereof. High frequency ultrasonic measuring bursts of acoustic energy are transmitted back and forth between the transducers 54 and 56, which as previously described, are alternately each used as both acoustic transmitter and acoustic receiver. Thus pulses are transmitted alternately in both directions along a direction generally parallel to the signal path 58 indicated in the formation 12. The signal path 58 of the measuring signals is at least partly affected by the fluid flow along fluid flow path 52. The transit time for acoustic signals from the transducer 54 to the transducer 56 is measured. The transmission time of sonic energy travelling in the opposite direction from transceiver 56 toward transceiver 54 is also measured. The change in these two transmission times caused by fluid flow along the path 58 provides a measure of the permeability of the formation 12.

The excitation transducers 46 and 48 are preferably rotatably mounted on a mandrel in the sonde 40 and are acoustically coupled to the exterior. Preferably, the frequency of operation for the excitation transducers 46 and 48 is in the range of about 50 to 500 hertz. The frequency of excitation for the measuring transducers 54 and 56 is again as in the previous embodiment, at least tenfold greater. This large frequency difference is particularly advantageous in filtering the low frequency sonic wave from the measuring transducers which, can of course, also detect the low frequency sonic wave.

FIG. 2 also incorporated a schematic block diagram of circuitry which is useful in driving the transducers. This circuitry is included inside the sonde 40. A pulsed electrical power source 60 is connected to the excitation transducers 46 and 48 to provide operation power. High voltage power supplies capable of supplying 3000 to 4000 volts DC pulses of short duration are known in the art for this purpose. When the piezoelectric or magnetostrictive transducers 46 and 48 are pulsed with the high voltage pulse from the power source 60 a small portion of this pulse is sampled and is supplied as a clock pulse on conductor 62 to a multiplexer 64. The multiplexer 64 is also connected to the measurement transducers 54 and 56. The multiplexer 64 functions to route the signals from transceiving transducers 54 and 56 to either transmitter processing circuit 66 or receiver processing circuit 68 depending on the instant function (transmit or receive) being served by this particular transducer.

The multiplexer 64 connects the receiving transducer (54 or 56) to receiver circuit 68 through a high pass filter 70. When clocked by the pulses from power source 60 the multiplexer 64 thus provides appropriate connections. One transducer (either 54 or 56) is connected as an ultrasonic transmitter to transmitter circuit 66 while the opposite transducer (54 or 56) is connected (via high pass filter 70) as an ultrasonic receiver circuit 68.

The transmitter control circuit 66 and receiver circuit 68 are both also connected to a differential time indicator 72. Differential time indicator 72 receives a pulse from transmitter circuit 66 whenever the transmitting transducer is fired. Similarly, differential time indicator 72 receives a second input pulse from receiver circuit 68 when a signal exceeding a preset noise level threshold is received. The differential time indicator circuit 72 produces an output signal which is proportional to the elapsed time between these signals. This output signal then is sent to the surface for recording via the well logging cable as previously discussed with respect to FIG. 1. The multiplexer 64 then reverses the connection of the transmitter circuit 66 and receiver circuit 68 to the transducers 54 and 56 and the time for transit signal between the two transducers in the opposite direction in the formation 12 is again measured. The change in transit time is a measure of permeability in the formation 12.

The apparatus of FIG. 1 and FIG. 2 is adapted to be positioned opposite selected stations or depth levels in a well bore where measurements are taken. Thereafter, it can be moved to another level in the well for additional logging. The apparatus is required to be on station at a particular depth level only so long as is required to enable transmission between the measuring transducers in both directions. The travel time change indication measured thereby is functionally related to the permeability in the formation 12 adjacent to the borehole. By taking measurements in formations of known permeability the tool may be calibrated.

The foregoing disclosure has been directed to preferred embodiments of the present invention. Alterations and variations may be made apparent to those skilled in the art thereby and can be incorporated without departing from the true spirit and scope hereof which is determined by the claims appended hereto.

We claim:

1. A method for measuring permeability of a formation adjacent to a borehole comprising the steps of:
    exciting the formation by imposing acoustic radiation on the formation from two sources, one forming a compressive wave front and the other forming a rarefaction wave front to create fluid flow in the formation; and,
    measuring the transit time of acoustic energy in the formation as modified by the fluid flow to determine the change in transit time as a measure related to the permeability.

2. The method of claim 1 including the step of excitating the fluid in the formation in such a manner that fluid in the formation tends to flow in a first direction; and,
    wherein the measuring step includes transmitting ultrasonic energy through the formation along the first direction and measuring the time required for transmission over a specified distance.

3. The method of claim 2 including the step of transmitting ultrasonic energy in the first direction and opposite to the first direction and measuring the time change required for transmission over a specified distance in the two directions.

4. The method of claim 3 wherein two time measurements are made and the difference obtained.

5. The method of claim 1 using a pair of similar excitation transducers which are oppositely energized.

6. The method of claim 5 wherein the excitation transducers are positioned vertically with respect to a formation.

7. The method of claim 6 wherein measuring transducers are located between the excitation transducers.

8. The method of claim 7 wherein said excitation and measuring transducers are brought into contact with a side wall of the borehole for transmission into the adjacent formation.

9. Formation permeability logging apparatus comprising:
    a sonde adapted to be lowered into a well to be tested;
    excitation transducer means carried on said sonde and including at least two transducers which are driven with signals of opposite polarities for forming an acoustic wavefront impinging on a formation to be tested to create a localized fluid flow in the formation;
    means for transmitting a sonic wave through the localized fluid flow in the formation; and,
    means for measuring variations in transmission time of the sonic wave as a result of passage through the localized fluid flow which variations are a function of the permeability of the formation.

10. The apparatus of claim 9 wherein said transmitting means cooperates with a receiving means and sonic signals are transmitted therebetween of a specified frequency and at timed intervals.

11. The apparatus of claim 9 wherein said means for measuring includes means for measuring transmission time variations of sonic wave traveling in opposide directions through the localized fluid flow.

* * * * *